United States Patent [19]
Ezawa

[11] Patent Number: 5,628,041
[45] Date of Patent: May 6, 1997

[54] FILM SUPPLYING DEVICE AND METHOD

[75] Inventor: Akira Ezawa, Kanagawa-ken, Japan

[73] Assignee: Nikon Corporation, Tokyo, Japan

[21] Appl. No.: 535,829

[22] Filed: Sep. 28, 1995

[30]     Foreign Application Priority Data

Dec. 2, 1994  [JP]  Japan .................................. 6-299674

[51] Int. Cl.$^6$ .................................................. G03B 1/00
[52] U.S. Cl. .................................................. 396/418
[58] Field of Search ........................... 354/173.1, 212, 354/214

[56]              References Cited

U.S. PATENT DOCUMENTS

| | | | |
|---|---|---|---|
| 4,739,359 | 4/1988 | Fukahori et al. | 354/173.1 |
| 5,160,953 | 11/1992 | Iwashita et al. | 354/173.1 |
| 5,365,301 | 11/1994 | Sugita et al. | 354/400 |

FOREIGN PATENT DOCUMENTS 5-59439  8/1993  Japan .

*Primary Examiner*—Safet Metjahic
*Assistant Examiner*—John Chizmar
*Attorney, Agent, or Firm*—Oliff & Berridge

[57]                   ABSTRACT

A film supply device that accurately stops the film in a short length of time at a predetermined position even when using increased film supply speed. A film supply device includes a motor and a transfer mechanism. The transfer mechanism has an input gear rotated by the motor and that transfers the input gear rotation to a winding shaft for the film. The film supply device further includes a revolution preventing mechanism and a planetary clutch mechanism having a sun gear and a planetary gear. The sun gear is rotated by the motor. The planetary gear revolves about the sun gear and is rotated by the sun gear. The planetary gear enmeshes with the input gear and revolves in a connected direction when the sun gear rotates in a first direction. The planetary gear is separate from the input gear and revolves in a release direction when the sun gear rotates in a second direction. The revolution preventing mechanism prevents revolution of the planetary gear in the release direction when the sun gear decelerates in a first direction and the input gear is driven by the planetary gear.

20 Claims, 7 Drawing Sheets

FILM SUPPLYING DEVICE AND METHOD

BACKGROUND OF THE INVENTION

1. Field of the Invention

The present invention relates to a film supply device that transfers the rotation of a motor to a winding shaft through a planetary clutch mechanism.

2. Description of Related Art

FIG. 7 shows an example of a camera film supply device. With this device, the rotation of a motor 2 is transferred to a sun gear (central gear) 12 of the planetary clutch mechanism through gears 4, 6, 8 and 10. The planetary clutch mechanism has a planetary lever 14 that rotates about the axis of rotation of the sun gear 12. A planetary gear 16 revolves about the sun gear 12 supported by the planetary lever 14. A regulating shaft 18 extends from the axis of rotation of the planetary gear 16. The regulating shaft 18 inserts into an elongated hole 20a in a body base plate 20 to restrict the range of rotation of the planetary lever 14 to a fixed angle. A compression spring (not shown) is mounted between the planetary lever 14 and either the sun gear 12 or the planetary gear 16. The planetary lever 14 rotates integrally with the sun gear 12 under the frictional force of the compression spring.

When the motor 2 rotates in the direction labelled R1, the planetary gear 16 and gear 50 enmesh (as shown in FIG. 8A), and the rotation of the motor 2 is transferred to a spool gear 54 through a gear 50 and a gear 52. This causes a winding spool 56 to rotate in the direction labelled R3 in FIG. 7, and wind the film 92 drawn from the cartridge 90. The winding spool 56 is formed as an integral unit with the spool gear 54. When the motor 2 rotates in the direction labelled R2, the planetary gear 16 enmeshes with gear 60. A rewinding fork 70 is rotated in the direction labelled R4 through gears 62, 64, 66 and 68. The rewinding fork 70 rewinds film 92 into the cartridge 90.

During the winding of the film 92, perforations 94 in the film 92 that pass by a reflective optical sensor 80 are detected. The number of passing perforations 94 controls the rotation of the motor 2. For example, when there are eight perforations 94 for a single photo frame, the motor 2 is driven to rotate at full speed until six of the perforations 94 have passed. Braking of the rotation of the motor 2 is then performed so that the film 92 stops at the point where the eighth perforation 94 is detected. Braking of the motor 2 can be performed by applying a reverse current for a short period of time (pulse current).

The film supply speed is large when the motor 2 of the conventional film supply device rotates at full speed. This causes the planetary gear 16 to separate sometimes from the gear 50 when the motor 2 is braked suddenly. From the full speed rotation R1 state as shown in FIG. 8A, the motor 2 enters the braking section (the section after the sixth perforation has passed in the example). A negative angular acceleration is created from the gear 4, the gear 6, the gear 8, the gear 10, and the sun gear 12 to the planetary gear 16 accompanying the motor 2 braking. The gear 50, the gear 52 and the spool gear 54 try to maintain rotation because of inertia. Consequently, the peripheral speed of the gear 50 is greater than the peripheral speed of the planetary gear 16. Therefore, the planetary gear 16 is repelled and separates from the gear 50, as shown in FIG. 8B. When the planetary gear 16 separates from the gear 50, film supplying cannot be controlled even if the motor 2 is controlled. Thus, stopping the film 92 at the desired position is not possible.

There is no alternative to eliminating rapid braking of the motor 2. Consequently, to prevent the described problem, either lowering the number of rotations of the motor 2 at full speed or lengthening the braking section is required. However, these countermeasures eliminate high speed film supplying. Further, the time needed to wind one frame of the film 92 becomes longer.

An additional problem exists because conditions under which the planetary gear 16 is repelled vary widely. The conditions vary widely because of fluctuations in the film supply speed and mechanical errors in the planetary clutch mechanism. Thus, accurate braking control settings are difficult to realize.

SUMMARY OF THE INVENTION

An object of the present invention is to provide a film supply device that accurately stops the film in a short length of time at a predetermined position, even when using an increased film supply speed.

A film supply device includes a motor and a transfer mechanism. The transfer mechanism has an input gear rotated by the motor and that transfers the input gear rotation to a winding shaft for the film. The film supply device further includes a revolution preventing mechanism and a planetary clutch mechanism having a sun gear and a planetary gear. The sun gear is rotated by the motor and the planetary gear revolves about and is rotated by the sun gear. The planetary gear enmeshes with the input gear and revolves in a connected direction when the sun gear rotates in a first direction. The planetary gear is separated from the input gear and revolves in a connection release direction (release direction) when the sun gear rotates in a second direction. The revolution preventing mechanism prevents revolution of the planetary gear in the release direction when the sun gear decelerates in a first direction while the input gear is driven by the planetary gear. Accordingly, any negative angular deceleration acting on the planetary gear is not transferred to the input gear.

The revolution prevention mechanism may further constrain the planetary gear or movable member rotatably coupled with the planetary gear on the opposite side of the planetary gear from the position where the planetary gear and the input gear engage. Thus, the rotational axis of the planetary gear is between the movable member and the input gear. When the planetary gear and the input gear are enmeshed, an empty space exists for the planetary gear to separate from the input gear in the region on the opposite side of the axis of rotation with respect to the enmeshing position. The empty space can be effectively used as the location of the revolution preventing mechanism.

The revolution preventing mechanism may further include a movable member and a preventing member. The movable member moves between a first position when the sun gear rotates in a first direction and a second position when the sun gear rotates in a second direction. The preventing member prevents the revolution of the planetary gear in the release direction when the movable member is in the first position with the planetary gear enmeshed with the input gear by physically opposing the movable member. Accordingly, the revolution of the planetary gear is prevented because the planetary gear revolves integrally with the movable member. However, the preventing member and the movable member do not contact each other when the movable member is in the second position.

The film supply device may still further include a movement conversion mechanism that converts the movement input into the planetary clutch mechanism to drive the movable member between the first position and the second position. Accordingly, no additional drive source is needed for the movable member. One structure, for example, that converts the planetary clutch movement is a movable member that rotates, coupled by the movement conversion mechanism, about the planetary gear rotational axis. The movement conversion mechanism is the force of friction between the movable member and the planetary gear, for example. The friction drives the movable member between the first position and the second position.

Further, when the planetary gear rotates, the direction of the force of friction acting on the movable member changes with the rotational direction. Thus, the movable member moves to either the first position or the second position. Therefore, the planetary gear rotates and the movable member remains in a fixed position by applying to the movable member only the force needed to oppose the force of friction.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

A first preferred embodiment of a film supply device according to the present invention will be described with reference to FIGS. 1 to 4.

Figure 1:
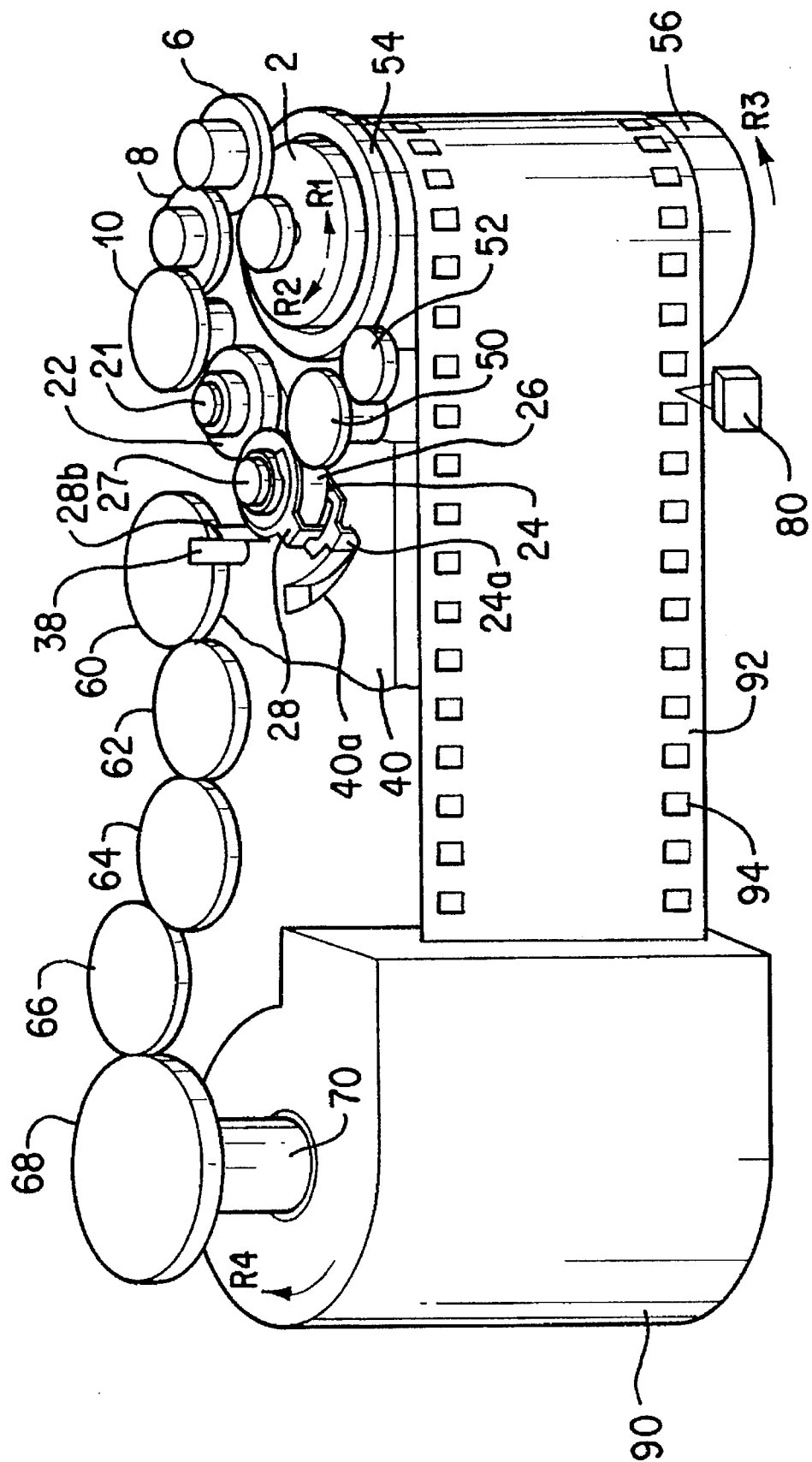
FIG. 1 shows a film supply device according to one embodiment of the present invention.
Figure 2:
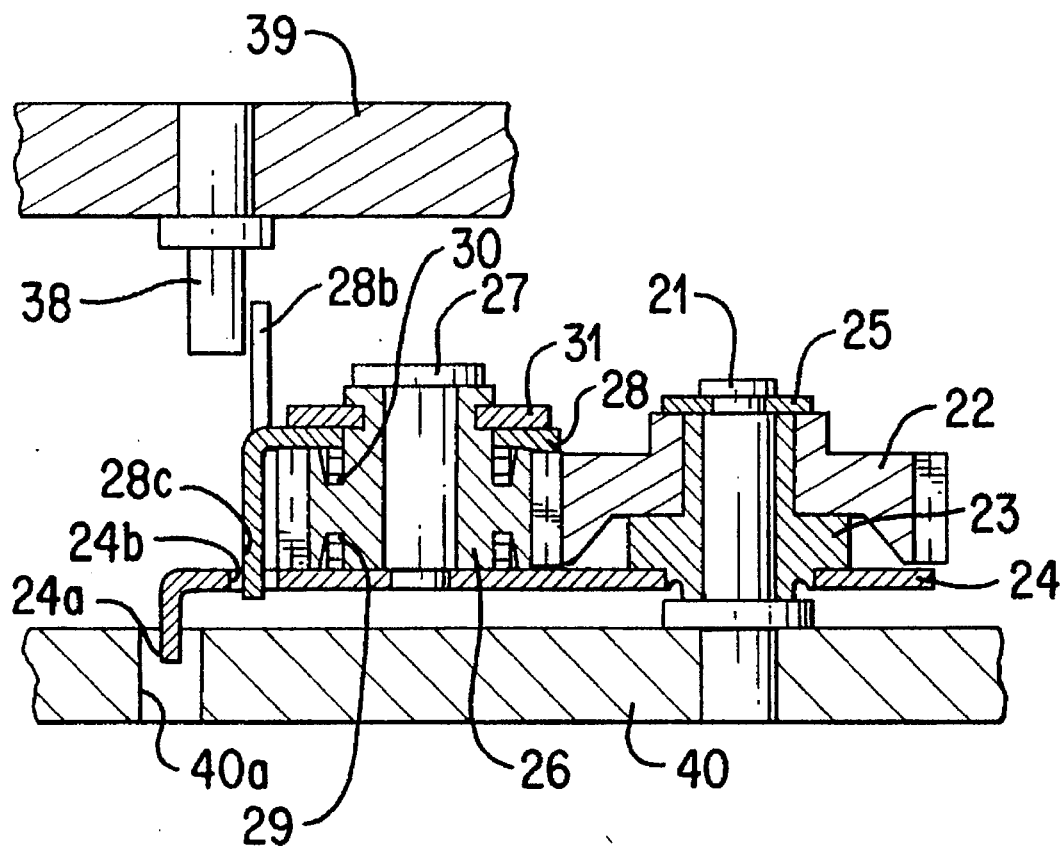
FIG. 2 is a cross-sectional diagram showing the planetary clutch mechanism.
Figure 3:
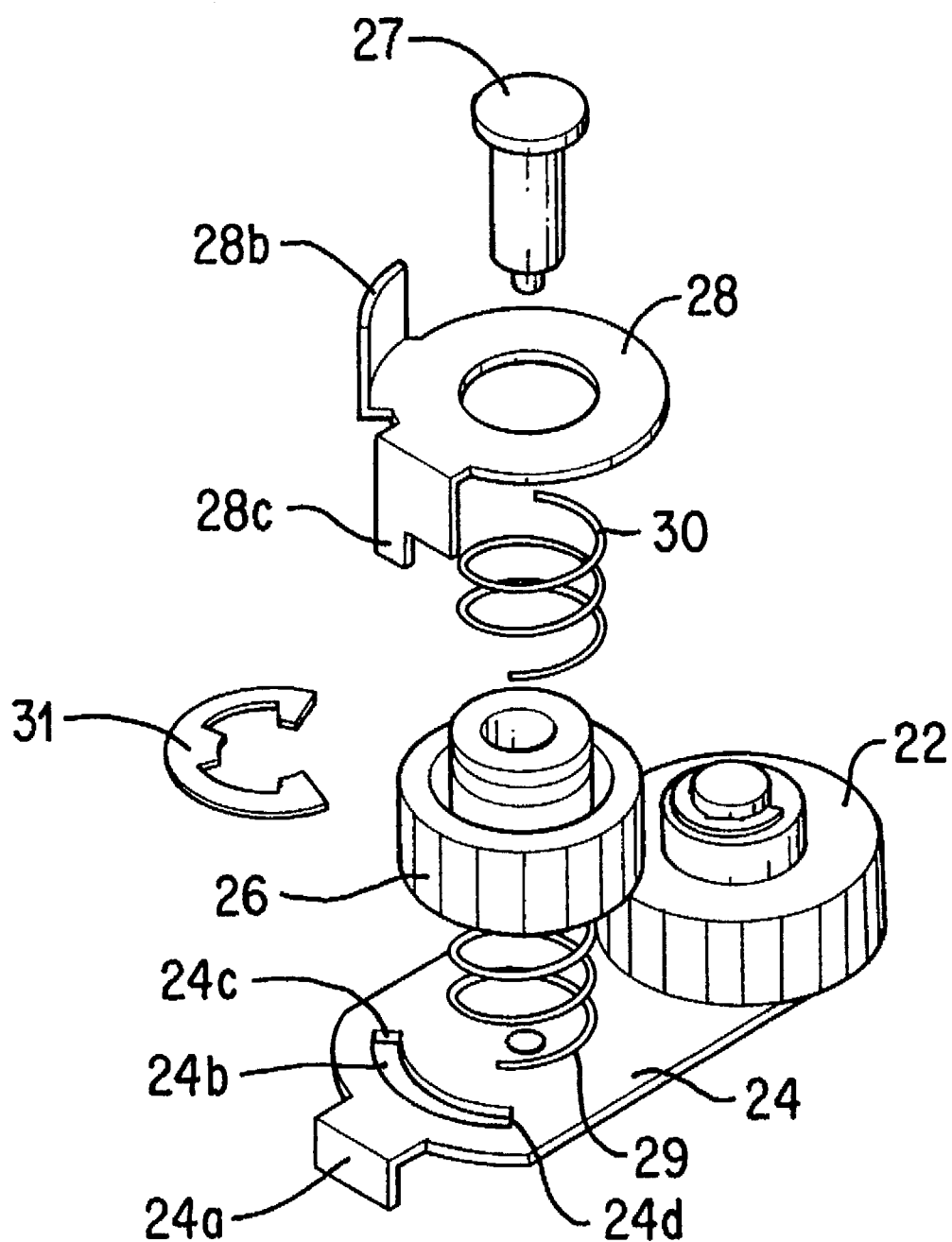
FIG. 3 is a partially exploded oblique view showing the planetary clutch mechanism.
Figure 7:
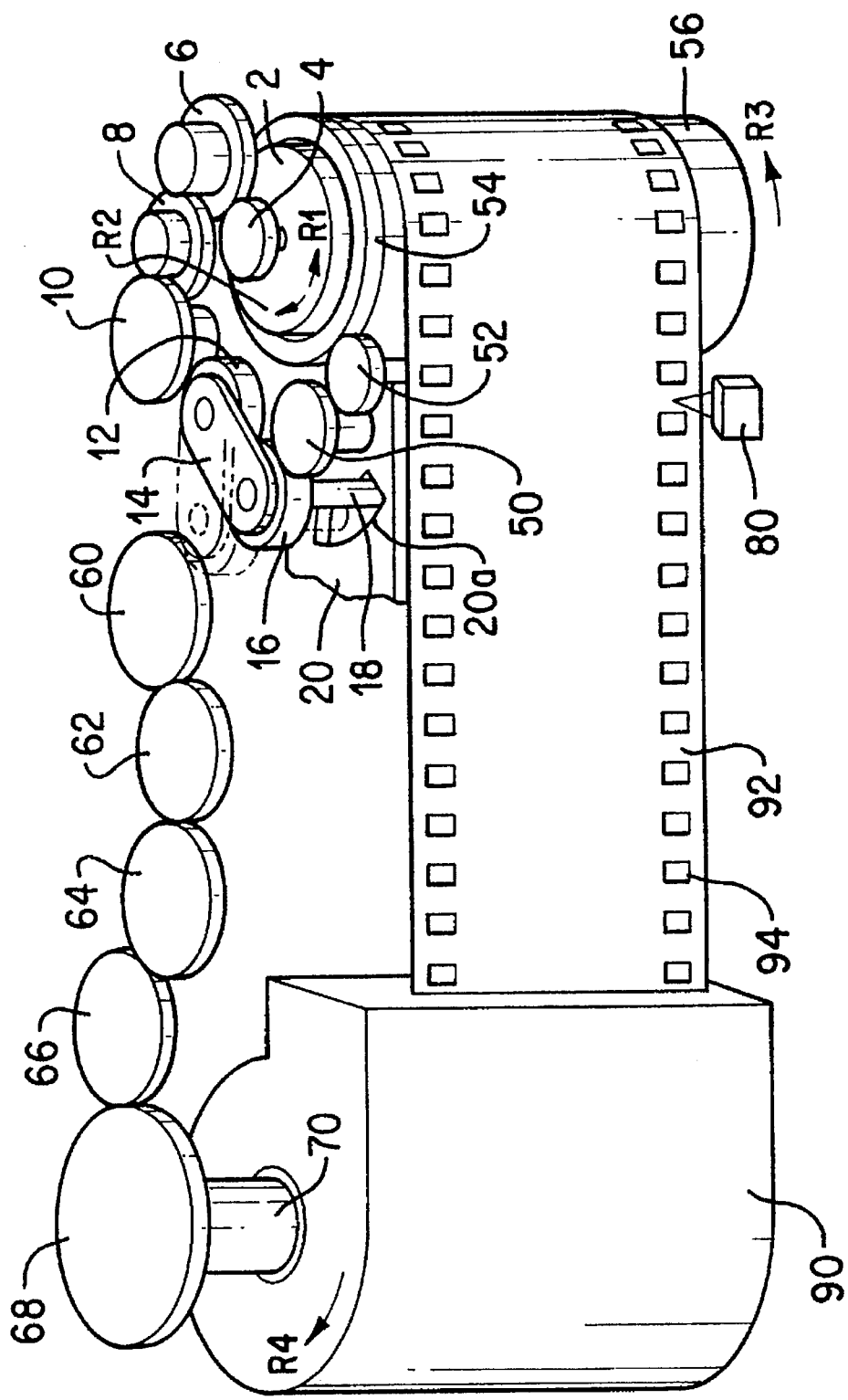
FIG. 7 shows a film supply device.
Figure 8A:
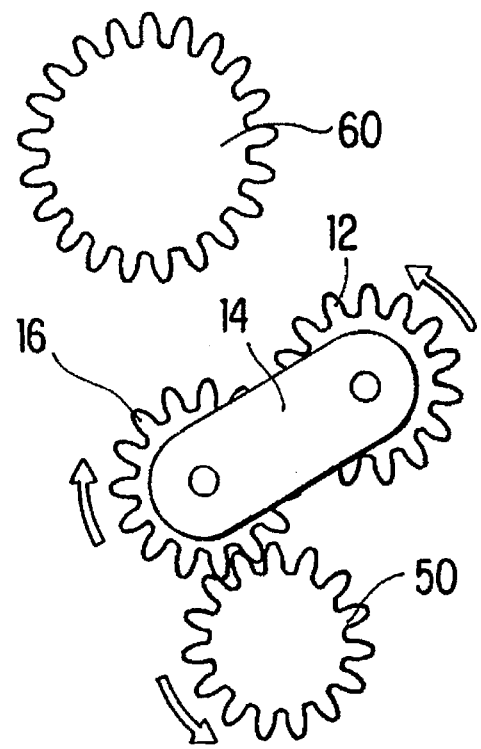
FIGS. 8(a) and 8(b) show a problem inherent in one type of conventional film supply devices.
Figure 8B:
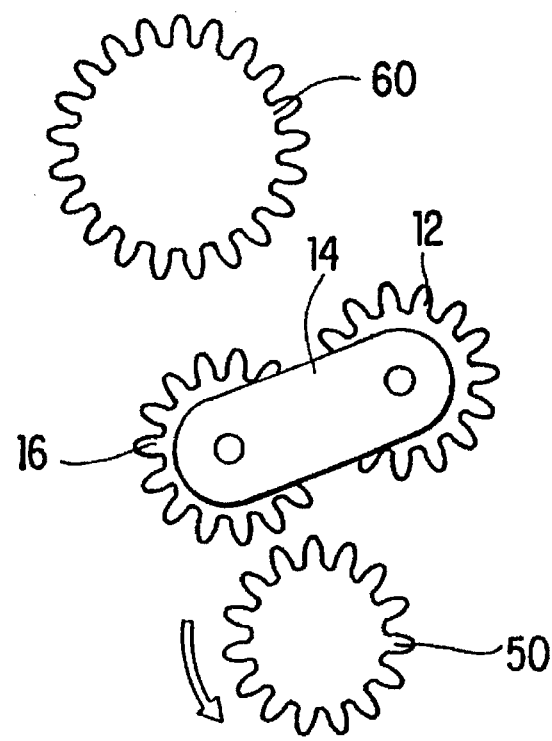

The first preferred embodiment is a variation of a planetary clutch mechanism for the film supply device as shown in FIG. 7. FIG. 1 is a drawing showing the configuration of the film supply device of the first preferred embodiment. A planetary lever 24 connects a sun gear 22 having a revolution shaft 21 to a planetary gear 26. As shown in FIG. 2, the revolution shaft 21 is socket-joined at a fixed position in a lower gear plate 40 of the camera. A sleeve 23 is mounted to freely rotate on the outer perimeter of the revolution shaft 21. A planetary lever 24 is socket-joined to the bottom surface of the sleeve 23. The sun gear 22 is mounted to freely rotate on the outer perimeter of the sleeve 23. The sun gear 22 and the sleeve 23 are punch-locked into the revolution shaft 21 by a lock wheel 25. As shown in FIG. 3, a bent unit 24a is formed at the tip of the planetary lever 24. The bent unit 24a is inserted into an elongated hole 40a in the lower gear plate 40. Through the interaction of the elongated hole 40a and the bent unit 24a, the rotation of the planetary lever 24 about the revolution shaft 21 is restricted within a set angle.

A planetary shaft 27 is mounted at the tip of the planetary lever 24. The planetary gear 26 and a regulating plate 28 are mounted to freely rotate on the outer perimeter of the planetary shaft 27. A coil spring 29 is situated between the planetary lever 24 and the planetary gear 26. A coil spring 30 is situated between the planetary gear 26 and the planetary regulating plate 28. The planetary shaft 27 is attached to the planetary lever 24. A stop wheel 31 is used to insert the regulating plate 28. The stop wheel 31 is mounted on the planetary gear 26, which slightly compresses the coil springs 29 and 30. The planetary lever 24, the planetary gear 26 and regulating plate 28 are mutually coupled by friction caused by the restoring force of the coil springs 29 and 30. The regulating plate 28 includes a top bent unit 28b and a bottom bent unit 28c on the outer perimeter. The bottom bent unit 28c is inserted into an elongated hole 24b in the planetary lever 24. Thus, the rotation of the regulating plate 28 is restricted to within a fixed angle. The top bent unit 28b can be engaged with and released from a pin 38 protruding from a top gear plate 39. The positional relationship between the top bent unit 28b and the pin 38 is described below.

Figure 4A:
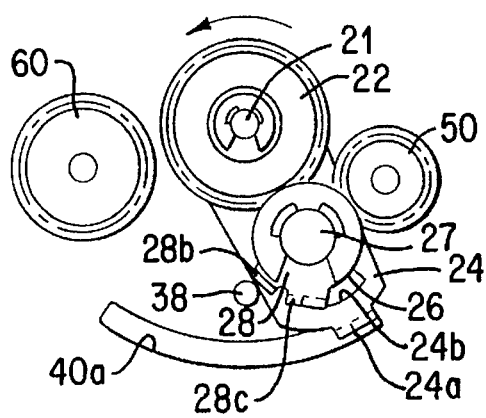
FIGS. 4(a)–4(f) show the operation of the planetary clutch mechanism.

The operation of the planetary clutch mechanism of the first preferred embodiment will now be described. When the motor 2 rotates in the R1 direction of FIG. 1 to wind the film 92, the sun gear 22 rotates in the counterclockwise direction, as shown in FIG. 4(a). The enmeshed planetary gear 26 rotates in the clockwise direction about the planetary shaft 27. The planetary lever 24 rotates in the counterclockwise direction about the revolution shaft 21 by the force of friction acting between the planetary lever 24 and the planetary gear 26. Therefore, the planetary gear 26 enmeshes with the gear 50. Through the interaction between the planetary gear 26 and the gear 50, the film 92 is wound onto the winding spool 56. The regulating plate 28 rotates clockwise like the planetary gear 26 about the planetary shaft 27 under the force of friction acting between the planetary gear 26 and the regulating shaft 28. The bottom bent unit 28c stops abutted and in contact with an edge 24c of the elongated hole 24 as shown in FIG. 3. At this time, the top bent unit 28b and the pin 38 align and oppose each other, as shown in FIG. 4(a). A small space remains between the top bent pin 28b and the pin 38. The space is extra space having a size determined by variances in the dimensions of parts.

Figure 4D:
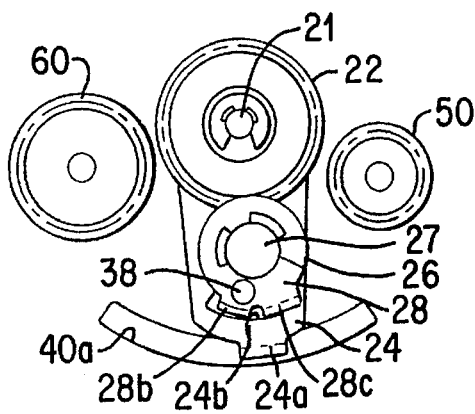
Figure 4B:
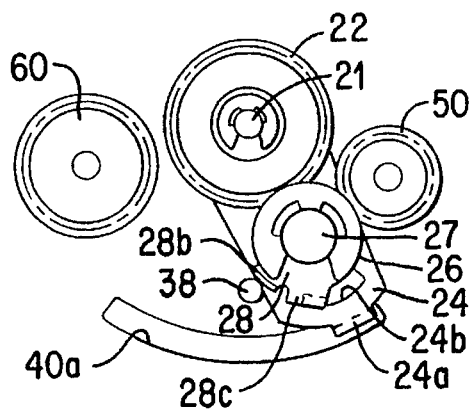

When the motor 2 is rapidly decelerated during film winding, the peripheral speed of gear 50 is greater than that of the planetary gear 26. Therefore, the planetary gear 26 tries to separate from gear 50. However, the top bent unit 28b contacts the pin 38 as shown in FIG. 4(b) to prevent the separation. The planetary gear 26 remains enmeshed with gear 50. Therefore, accurate braking of the winding spool 56 remains possible through braking control of the motor 2.

As shown in FIG. 1, the motor 2 rotates in the R2 direction to rewind the film into the cartridge 90. As shown in FIG. 4(b), the sun gear 22 rotates in the clockwise direction causing the planetary lever 24 to also try to rotate in the clockwise direction. However, the top bent unit 28b and the pin 38 are in contact at this time to prevent the rotation of the planetary lever 24. As shown in FIG. 4(c), because the planetary gear 26 rotates in the counterclockwise direction about the planetary shaft 27 during rewinding, the regulating plate 28 starts to rotate in the counterclockwise direction about the planetary shaft 27. When the angle of rotation of the regulating plate 28 reaches a predetermined amount as shown in FIG. 4(d), the top bent unit 28b moves to a position that does not interfere with the pin 38. Thus, the planetary lever 24 starts to rotate in the clockwise direction. At this time, the bottom bent unit 28c of the regulating plate 28 is in a position separated by a small space from an end 24d (see FIG. 3) of the elongated hole 24b. The small space is also extra space sized in consideration of errors in the manufacturing of the respective components.

Figure 4E:
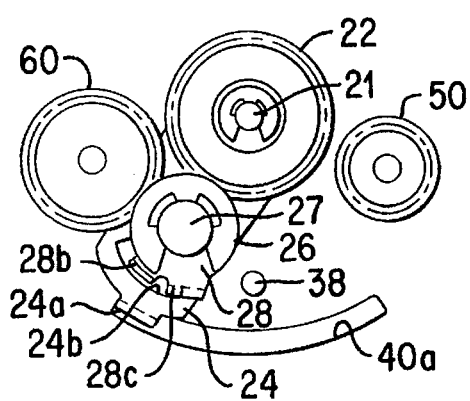
Figure 4C:
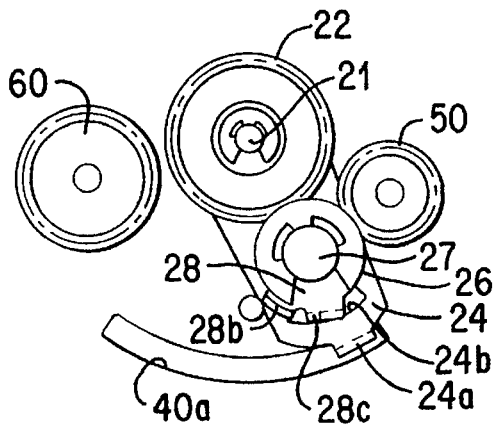
Figure 4F:
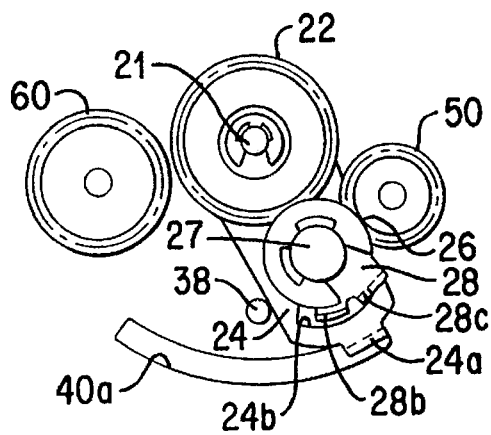

When the planetary lever 24 rotates in the clockwise direction, the planetary gear 26 and the gear 60 enmesh as shown in FIG. 4(e). As shown in FIG. 1, the gears 60–68 drive the rewinding fork 70 so that the film is rewound. At this time, the regulating plate 28 is stopped at a position with the bottom bent unit 28c abutted and in contact with the end 24d of the elongated hole 24b, as shown in FIG. 3. When rewinding has been completed, the motor 2 rotates in the R1 direction to wind the next film. The planetary lever 24 rotates in a counterclockwise direction and the planetary gear 26 and the gear 50 enmesh, as shown in FIG. 4(f). Through the interaction of the planetary gear 26 and the gear 50, driving of the winding spool 56 is started. The regulating plate 28 rotates in a clockwise direction about the planetary shaft 27, and the film supply device returns to the condition shown in FIG. 4(a).

In the first preferred embodiment, the top bent unit 28b and the pin 38 are engaged only when the planetary gear 26 and gear 50 are enmeshed. The top bent unit 28b is separated from the pin 38 to permit movement of the planetary lever 24 when the planetary gear 26 rotates in the reverse direction and when the planetary gear 26 is enmeshed with the gear 60.

A second preferred embodiment according to the present invention will now be described with reference to FIGS. 5 and 6. The description of components in FIGS. 5 and 6 previously described are omitted.

Figure 5:
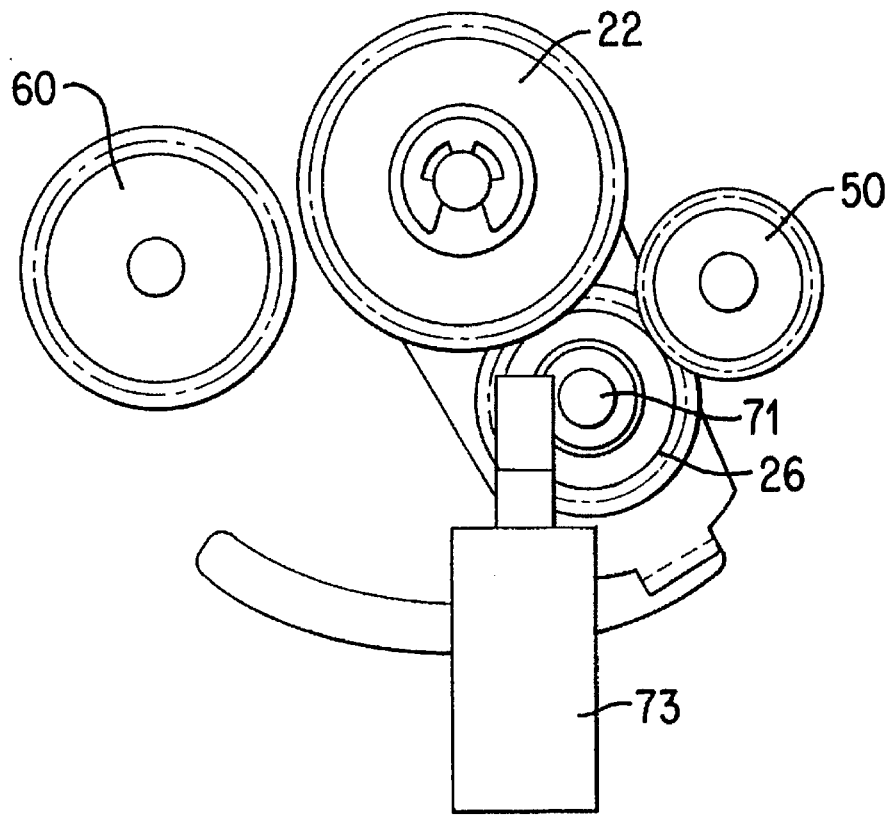
FIG. 5 is a planar view showing the planetary clutch mechanism according to another embodiment of the present invention.
Figure 6:
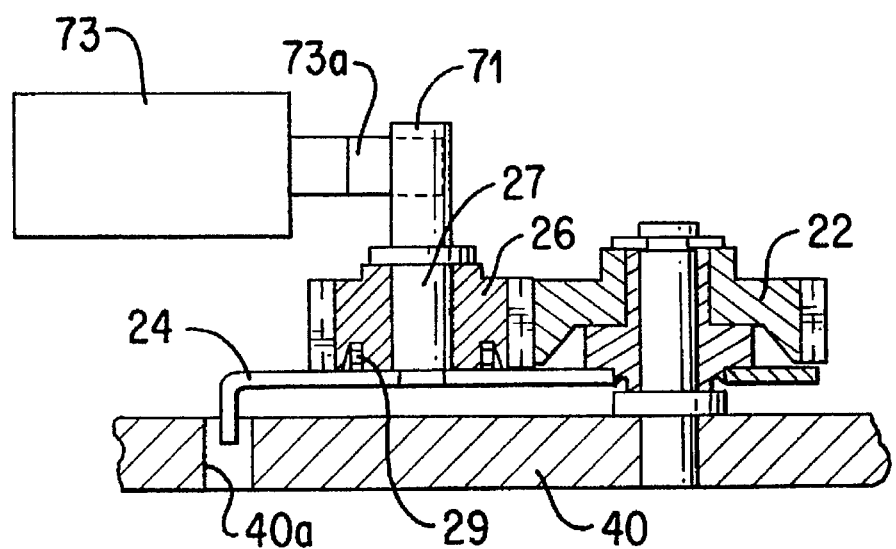
FIG. 6 is a cross-sectional view showing the planetary clutch mechanism of FIG. 5.

As shown in FIGS. 5 and 6, the regulating plate 28 and the coil spring 30 of the first preferred embodiment are omitted for the second preferred embodiment. A restriction shaft 71 is provided at the top end of the planetary shaft 27 coaxial with the planetary shaft 27. Further, a solenoid 73 is on the opposite side of the planetary gear 26 from the position where the planetary gear 26 and the gear 50 enmesh. Thus, the rotational axis of the planetary gear 26 is between the solenoid 73 and the input gear 50. When the solenoid 73 is magnetized, a movable end 73a protrudes out to the rear of the restriction shaft 71 to restrict the planetary gear 26 to the position enmeshed with the gear 50. When the solenoid 73 is demagnetized, the movable end 73a withdraws as shown by the dot-and-dash line in FIG. 6. Movement of the planetary lever 24 becomes possible when the movable end 73a is withdrawn.

With the second preferred embodiment, preventing and allowing the revolution of the planetary gear 26 are performed by switching between magnetization and demagnetization, respectively, of the solenoid 73. For example, when the film is wound by the motor 2 rotating in the R1 direction, the solenoid 73 is magnetized causing the movable end 73a to protrude. The enmeshing of the planetary gear 26 and the gear 50 can be maintained without regard to variations in the speed of the motor 2. Further, other embodiments would also be successful where the movable end 73a protrudes only when braking the motor 2.

The described preferred embodiments include a winding spool, a transfer mechanism, a revolution prevention mechanism, a revolution member, a movable member, a prevention member and a movement conversion member. The winding spool 56 includes at least a winding shaft. The transfer mechanism includes at least the gears 50, 52 and 54. The revolution prevention mechanism may include the regulating plate 28 and the pin 38 or alternatively the movable end 73a and the planetary shaft 27. The revolution member and the movable member may include the regulating plate 28. The prevention member may include the pin 38 or the planetary shaft 27. The movement conversion mechanism includes at least the coil spring 30 and the stop wheel 31.

The revolution prevention mechanism prevents the revolution of the planetary gear in a direction that allows separation from the input gear during deceleration of the sun gear. Therefore, the braking force of the motor can be transferred to the film winding shaft regardless of the film supplying speed. Accordingly, the high speed full-speed supplying interval for supplying one frame of the film can be made longer and rapid braking can quickly complete the film frame supply. Further, the empty space around the planetary clutch mechanism is at a minimum and effectively used, which keeps the supplying device small despite the installation of the revolution prevention mechanism.

It is possible to switch between preventing and allowing the revolution of the planetary gear through changing the position of a movable member corresponding to the sun gear rotational direction. Thus, the revolution prevention mechanism can be kept simple. The sun gear can revolve integrally with the planetary gear. Cost may be reduced by operating the revolution prevention mechanism using the movement input into a planetary clutch mechanism. Therefore, adding a driving source is unnecessary. Moving the movable member by applying a force of friction between the planetary gear and the movable member is a simple mechanism to change the direction of movement of the movable member and the fixed position support.

While this invention has been described in conjunction with the specific embodiments outlined above, it is evident that many alternatives, modification and variations will be apparent to those skilled in the art. Accordingly, the preferred embodiments of the invention as set forth above are intended to be illustrative and not limiting. Various changes may be made without departing from the spirit and scope of the invention as defined in the following claims.

What is claimed is:

1. A film supply device comprising:

a motor;

a transfer mechanism having an input gear rotated by the motor that rotates a winding shaft for film;

a planetary clutch mechanism including a sun gear rotated by the motor and a planetary gear revolving about the sun gear and rotated by the sun gear, the planetary gear enmeshing with the input gear and revolving in a connection direction when the sun gear rotates in a first direction, the planetary gear revolving in a release direction and being separate from the input gear when the sun gear rotates in a second direction; and a revolution preventing mechanism, which moves between a first position in which the planetary gear is prevented from revolving in the release direction and a second position in which the planetary gear is allowed to revolve in the release direction, wherein the revolution preventing mechanism moves under force from the motor.

2. The film supply device according to claim 1, wherein the revolution preventing mechanism restricts the planetary gear on an opposite side of the planetary gear from an enmeshing position of the planetary gear with the input gear, and an axis of rotation of the planetary gear is located between the opposite side of the planetary gear and the enmeshing position.

3. The film supply device according to claim 1, wherein the revolution preventing mechanism includes a revolving member that revolves integrally with the planetary gear, the revolving member being restricted to prevent the planetary gear from revolving in the release direction.

4. The film supply device according to claim 1, wherein the revolution preventing mechanism further comprises:

a movable member that moves to the first position when the sun gear rotates in the first direction and moves to the second position when the sun gear rotates in the second direction; and a preventing member opposing the movable member to prevent the planetary gear from revolving in the release direction when the movable member is in the first position.

5. The film supply device according to claim 4, wherein the preventing member and the movable member do not contact each other when the movable member is in the second position.

6. The film supply device according to claim 4, further comprising a movement conversion mechanism that uses movement of the planetary clutch mechanism to drive the movable member between the first position and the second position.

7. The film supply device according to claim 6, wherein the movable member rotates about an axis of rotation of the planetary gear using friction between the movable member and the planetary gear to drive the movable member between the first position and the second position.

8. The film supply device according to claim 1, wherein said preventing mechanism is in said first position when the sun gear decelerates while rotating in the first direction.

9. A film supply device comprising:

a motor;

transfer means, including a first input gear and a second input gear, for transferring motor rotation to supply film;

planetary clutch means, including a sun gear rotated by the motor and a planetary gear revolving about the sun gear and being rotated by the sun gear, for revolving the planetary gear in a connect direction and enmeshing with the first input gear to drive a winding shaft when the sun gear rotates in a first direction and for revolving the planetary gear in a release direction to separate from the first input gear and enmesh with the second input gear to drive a cartridge shaft when the sun gear rotates in a second direction different from the first direction; and revolution preventing means that moves between a first position for preventing the planetary gear from revolving in the release direction and a second position in which the planetary gear is allowed to revolve in the release direction, wherein the revolution preventing means moves under force from the motor.

10. The film supply device according to claim 9, wherein the revolution preventing means restricts the planetary gear on an opposite side of the planetary gear from an enmeshing position of the planetary gear with the first input gear.

11. The film supply device according to claim 9, wherein the revolution preventing means restricts a revolving member that revolves integrally with the planetary gear to prevent the planetary gear from revolving in the release direction.

12. The film supply device according to claim 9, wherein the revolution preventing means further comprises:

a movable member that moves to the first position when the sun gear rotates in the first direction and moves to the second position when the sun gear rotates in the second direction; and a preventing device that prevents the planetary gear from revolving in the release direction when the movable member is in the first position.

13. The film supply device according to claim 12, wherein the preventing device and the movable member do not contact each other when the movable member is in the second position with the planetary gear enmeshed with the second input gear.

14. The film supply device according to claim 12, further comprising a movement conversion mechanism that uses movement of the planetary clutch means to drive the movable member between the first position and the second position.

15. The film supply device according to claim 14, wherein the movable member rotates about an axis of rotation of the planetary gear using friction between the movable member and the planetary gear to drive the movable member between the first position and the second position.

16. The film supply device according to claim 9, wherein said revolution preventing means is in said first position when the sun gear decelerates in the connect direction.

17. A method for supplying film to a camera, comprising the steps of:

connecting a motor to a sun gear to revolve a planetary gear about the sun gear, the planetary gear enmeshing with an input gear and revolving in a connect direction when the sun gear rotates in a first direction, the planetary gear separating from the input gear and revolving in a release direction when the sun gear rotates in a second direction, the input gear rotating a film supply shaft when the planetary gear revolves in the connect direction;

moving a movable member between a first position and a second position under a revolving forge of the planetary gear; and preventing the planetary gear from revolving in the release direction with the movable member when the movable member is in the first position.

18. The method of claim 17, wherein the preventing step further comprises:

moving a movable member to the first position when the sun gear rotates in the first direction; and opposing the movable member to prevent the revolution of the planetary gear in the release direction when the movable member is in the first position.

19. The method of claim 18, wherein the opposing step is not performed when the movable member is in the second position and the planetary gear is separated from the input gear.

20. The method of claim 17, wherein said preventing step is performed with the movable member when the sun gear decelerates while rotating in the first direction.

* * * * *